(12) United States Patent
Yim

(10) Patent No.: US 12,118,841 B2
(45) Date of Patent: Oct. 15, 2024

(54) IoT SWITCHGEAR OPERATION SYSTEM USING SOUND WAVE COMMUNICATION

(71) Applicants: DANSOLPLUS CO., LTD., Seoul (KR); Chang Soon Yim, Seoul (KR)

(72) Inventor: Chang Soon Yim, Seoul (KR)

(73) Assignees: DANSOLPLUS CO., LTD., Seoul (KR); Chang Soon Yim, Seoul (KR)

( * ) Notice: Subject to any disclaimer, the term of this patent is extended or adjusted under 35 U.S.C. 154(b) by 386 days.

(21) Appl. No.: 17/609,593

(22) PCT Filed: Apr. 22, 2020

(86) PCT No.: PCT/KR2020/005311
§ 371 (c)(1),
(2) Date: Nov. 8, 2021

(87) PCT Pub. No.: WO2021/060640
PCT Pub. Date: Apr. 1, 2021

(65) Prior Publication Data
US 2022/0237964 A1    Jul. 28, 2022

(30) Foreign Application Priority Data

Sep. 24, 2019  (KR) .................. 10-2019-0117751

(51) Int. Cl.
*G07C 9/00* (2020.01)
*G16Y 40/50* (2020.01)
(Continued)

(52) U.S. Cl.
CPC .......... *G07C 9/00182* (2013.01); *G16Y 40/50* (2020.01); *H04B 11/00* (2013.01);
(Continued)

(58) Field of Classification Search
CPC ...... G07C 9/00182; G07C 2009/00253; G07C 9/00309; G07C 2009/00801; G16Y 40/50;
(Continued)

(56) References Cited

FOREIGN PATENT DOCUMENTS

JP    2018145638 A  *  9/2018
KR    10-1648932 B1    8/2016
(Continued)

OTHER PUBLICATIONS

International Search Report for PCT/KR2020/005311 mailed Jul. 31, 2020 from Korean Intellectual Property Office.

*Primary Examiner* — James J Yang
(74) *Attorney, Agent, or Firm* — Paratus Law Group, PLLC

(57) ABSTRACT

An IoT switchgear operation system using sound wave communication including: a communication terminal for requesting, from an IoT switchgear via sound wave communication, one or more operations among manager registration, user registration, transmission of a changed password, transmission of a one-time digital key for a user, which is for the user himself/herself to open or close the IoT switchgear, and transmission of a one-time digital key for another person, which is for a terminal of another user to open or close the IoT switchgear; and the IoT switchgear for performing manager registration, user registration, a change of a password, storage of a one-time digital key for a user, and opening or closing of a door by using a one-time digital key for another person, which are requested by the communication terminal via sound wave communication with the communication terminal.

8 Claims, 16 Drawing Sheets

(51) Int. Cl.
  *H04B 11/00*   (2006.01)
  *H04W 4/12*   (2009.01)
  *H04W 8/18*   (2009.01)
(52) U.S. Cl.
  CPC ............ *H04W 4/12* (2013.01); *H04W 8/183* (2013.01); *G07C 2009/00253* (2013.01)
(58) Field of Classification Search
  CPC ........ H04B 11/00; H04W 4/12; H04W 8/183; H04W 4/70; H04W 12/068; H04W 12/08; H04W 12/61; H04W 12/72
  See application file for complete search history.

(56)   References Cited

FOREIGN PATENT DOCUMENTS

| KR | 1648932 B1 * | 8/2016 | ............ E05B 47/00 |
|----|----|----|----|
| KR | 10-2017-0019243 A | 2/2017 | |
| KR | 10-2018-0116741 A | 10/2018 | |
| KR | 10-2097577 B1 | 4/2020 | |

\* cited by examiner

FIG. 3

| Classification | 1 | 2 | 3 | 4 | 5 | 6 | 7 | 8 | 9 | 10 | ... | 15 | 16 | 17 | 18 | 19 | 20 |
|---|---|---|---|---|---|---|---|---|---|---|---|---|---|---|---|---|---|
| Frame1 | PIN CODE | | | | | NULL | | | | | | | | | | | |
| Frame2 | | | | | | | | 10-digit SSID | | | 12-digit IP address xxx.xxx.xxx.xxx | | | | | | |
| Frame3 | | | | | | | | 10-digit SSID | | | | | | | | | |
| Frame4 | | | | | | | | 10-digit SSID | | | | | | | | | |
| Frame5 | | 2-digit SSID | | | | | | | | 8-digit SSID password | | | | | | | |
| Frame6 | | | | | | | | 10-digit SSID | | | | | | | | | |
| Frame7 | | | | | | | | 10-digit SSID | | | | | | | | | |
| Frame8 | | | | 4-digit password | | | | | | 11-digit registrant phone number (manager) | | | | | | | |

< Manager registration frame >

FIG. 4

| Classification | 1 | 2 | 3 | 4 | 5 | 6 | 7 | 8 | 9 | 10 | ...... | 15 | 16 | 17 | 18 | 19 | 20 |
|---|---|---|---|---|---|---|---|---|---|---|---|---|---|---|---|---|---|
| Frame1 | PIN CODE | | | | | | | | | | | | | | | | |
| Frame2 | | | | | | Manager password | | | | | | | | | | | |
| Frame3 | User phone number 1 | | | | | | | | | | | | | | | | |
| Frame4 | User phone number 2 | | | | | | | | | | | | | | | | |
| Frame5 | User phone number 3 | | | | | | | | | | | | | | | | |
| | User phone number 4 | | | | | | | | | | | | | | | | |

< User registration frame >

FIG. 5

| Classification | 1 | 2 | 3 | 4 | 5 | 6 | 7 | 8 | 9 | 10 | ... | 15 | 16 | 17 | 18 | 19 | 20 |
|---|---|---|---|---|---|---|---|---|---|---|---|---|---|---|---|---|---|
| Frame1 | | PIN CODE | | | | | | | | | | | | | | | |
| Frame2 | | | | | | | User phone number | | | | | | | | | | |
| Frame3 | | NULL | | | | | | | | Current password | | | | | | | |
| | | | | | | | | | | Changed password | | | | | | | |

< Change password frame >

FIG. 6

| Classification | 1 | 2 | 3 | 4 | 5 | 6 | 7 | 8 | 9 | 10 | ...... | 15 | 16 | 17 | 18 | 19 | 20 |
|---|---|---|---|---|---|---|---|---|---|---|---|---|---|---|---|---|---|
| Frame1 | PIN CODE | | | | Classification | | | | | | | | | | | | |
| Frame2 | Phone number + OTP code (time stamp) | | | | | | | | | Password | | | | | | | |

< User's one-time digital key frame >

FIG. 7

| Classification | 1 | 2 | 3 | 4 | 5 | 6 | 7 | 8 | 9 | 10 | ...... | 15 | 16 | 17 | 18 | 19 | 20 |
|---|---|---|---|---|---|---|---|---|---|---|---|---|---|---|---|---|---|
| Frame1 | PIN CODE | | | | Classification | IoT switchgear unique number (unique MAC address) | | | | | | | | | | | |
| Frame2 | Phone number + OTP code (time stamp) | | | | | | | | | | | | | | | | |

< Another user's one-time digital key frame >

FIG. 15

Data frame frequency table

| Digit places \ Decimal numbers | 1 | 2 | 3 | 4 | 5 | 6 | 7 | 8 | 9 |
|---|---|---|---|---|---|---|---|---|---|
| 21 | Frequency21-1 | Frequency21-2 | Frequency21-3 | Frequency21-4 | Frequency21-5 | Frequency21-6 | Frequency21-7 | Frequency21-8 | Frequency21-9 |
| 20 | Frequency20-1 | Frequency20-2 | Frequency20-3 | Frequency20-4 | Frequency20-5 | Frequency20-6 | Frequency20-7 | Frequency20-8 | Frequency20-9 |
| 19 | Frequency19-1 | Frequency19-2 | Frequency19-3 | Frequency19-4 | Frequency19-5 | Frequency19-6 | Frequency19-7 | Frequency19-8 | Frequency19-9 |
| 18 | Frequency18-1 | Frequency18-2 | Frequency18-3 | Frequency18-4 | Frequency18-5 | Frequency18-6 | Frequency18-7 | Frequency18-8 | Frequency18-9 |
| 17 | Frequency17-1 | Frequency17-2 | Frequency17-3 | Frequency17-4 | Frequency17-5 | Frequency17-6 | Frequency17-7 | Frequency17-8 | Frequency17-9 |
| 16 | Frequency16-1 | Frequency16-2 | Frequency16-3 | Frequency16-4 | Frequency16-5 | Frequency16-6 | Frequency16-7 | Frequency16-8 | Frequency16-9 |
| 15 | Frequency15-1 | Frequency15-2 | Frequency15-3 | Frequency15-4 | Frequency15-5 | Frequency15-6 | Frequency15-7 | Frequency15-8 | Frequency15-9 |
| 14 | Frequency14-1 | Frequency14-2 | Frequency14-3 | Frequency14-4 | Frequency14-5 | Frequency14-6 | Frequency14-7 | Frequency14-8 | Frequency14-9 |
| 13 | Frequency13-1 | Frequency13-2 | Frequency13-3 | Frequency13-4 | Frequency13-5 | Frequency13-6 | Frequency13-7 | Frequency13-8 | Frequency13-9 |
| 12 | Frequency12-1 | Frequency12-2 | Frequency12-3 | Frequency12-4 | Frequency12-5 | Frequency12-6 | Frequency12-7 | Frequency12-8 | Frequency12-9 |
| 11 | Frequency11-1 | Frequency11-2 | Frequency11-3 | Frequency11-4 | Frequency11-5 | Frequency11-6 | Frequency11-7 | Frequency11-8 | Frequency11-9 |
| 10 | Frequency10-1 | Frequency10-2 | Frequency10-3 | Frequency10-4 | Frequency10-5 | Frequency10-6 | Frequency10-7 | Frequency10-8 | Frequency10-9 |
| 9 | Frequency 9-1 | Frequency 9-2 | Frequency 9-3 | Frequency 9-4 | Frequency 9-5 | Frequency 9-6 | Frequency 9-7 | Frequency 9-8 | Frequency 9-9 |
| 8 | Frequency 8-1 | Frequency 8-2 | Frequency 8-3 | Frequency 8-4 | Frequency 8-5 | Frequency 8-6 | Frequency 8-7 | Frequency 8-8 | Frequency 8-9 |
| 7 | Frequency 7-1 | Frequency 7-2 | Frequency 7-3 | Frequency 7-4 | Frequency 7-5 | Frequency 7-6 | Frequency 7-7 | Frequency 7-8 | Frequency 7-9 |
| 6 | Frequency 6-1 | Frequency 6-2 | Frequency 6-3 | Frequency 6-4 | Frequency 6-5 | Frequency 6-6 | Frequency 6-7 | Frequency 6-8 | Frequency 6-9 |
| 5 | Frequency 5-1 | Frequency 5-2 | Frequency 5-3 | Frequency 5-4 | Frequency 5-5 | Frequency 5-6 | Frequency 5-7 | Frequency 5-8 | Frequency 5-9 |
| 4 | Frequency 4-1 | Frequency 4-2 | Frequency 4-3 | Frequency 4-4 | Frequency 4-5 | Frequency 4-6 | Frequency 4-7 | Frequency 4-8 | Frequency 4-9 |
| 3 | Frequency 3-1 | Frequency 3-2 | Frequency 3-3 | Frequency 3-4 | Frequency 3-5 | Frequency 3-6 | Frequency 3-7 | Frequency 3-8 | Frequency 3-9 |
| 2 | Frequency 2-1 | Frequency 2-2 | Frequency 2-3 | Frequency 2-4 | Frequency 2-5 | Frequency 2-6 | Frequency 2-7 | Frequency 2-8 | Frequency 2-9 |
| 1 | Frequency 1-1 | Frequency 1-2 | Frequency 1-3 | Frequency 1-4 | Frequency 1-5 | Frequency 1-6 | Frequency 1-7 | Frequency 1-8 | Frequency 1-9 |

Reception number frequency table

| Frequency 1 | Frequency 2 | Frequency 3 | Frequency 4 | Frequency 5 | Frequency 6 | Frequency 7 | Frequency 8 | Frequency 9 | Frequency 10 | Frequency 11 |
|---|---|---|---|---|---|---|---|---|---|---|
| Frequency 12 | Frequency 13 | Frequency 14 | Frequency 15 | Frequency 16 | Frequency 17 | Frequency 18 | Frequency 19 | Frequency 20 | Frequency 21 | Frequency 22 |

FIG. 16

Ex) Frequency allocation when 20-digit first frame of 12345678901234567890 is transmitted Data frame frequency table

| Digit places \ Decimal numbers | 1 | 2 | 3 | 4 | 5 | 6 | 7 | 8 | 9 |
|---|---|---|---|---|---|---|---|---|---|
| 21 | Frequency21-1 | Frequency21-2 | Frequency21-3 | Frequency21-4 | Frequency21-5 | Frequency21-6 | Frequency21-7 | Frequency21-8 | Frequency21-9 |
| 20 | Frequency20-1 | Frequency20-2 | Frequency20-3 | Frequency20-4 | Frequency20-5 | Frequency20-6 | Frequency20-7 | Frequency20-8 | Frequency20-9 |
| 19 | Frequency19-1 | Frequency19-2 | Frequency19-3 | Frequency19-4 | Frequency19-5 | Frequency19-6 | Frequency19-7 | Frequency19-8 | Frequency19-9 |
| 18 | Frequency18-1 | Frequency18-2 | Frequency18-3 | Frequency18-4 | Frequency18-5 | Frequency18-6 | Frequency18-7 | Frequency18-8 | Frequency18-9 |
| 17 | Frequency17-1 | Frequency17-2 | Frequency17-3 | Frequency17-4 | Frequency17-5 | Frequency17-6 | Frequency17-7 | Frequency17-8 | Frequency17-9 |
| 16 | Frequency16-1 | Frequency16-2 | Frequency16-3 | Frequency16-4 | Frequency16-5 | Frequency16-6 | Frequency16-7 | Frequency16-8 | Frequency16-9 |
| 15 | Frequency15-1 | Frequency15-2 | Frequency15-3 | Frequency15-4 | Frequency15-5 | Frequency15-6 | Frequency15-7 | Frequency15-8 | Frequency15-9 |
| 14 | Frequency14-1 | Frequency14-2 | Frequency14-3 | Frequency14-4 | Frequency14-5 | Frequency14-6 | Frequency14-7 | Frequency14-8 | Frequency14-9 |
| 13 | Frequency13-1 | Frequency13-2 | Frequency13-3 | Frequency13-4 | Frequency13-5 | Frequency13-6 | Frequency13-7 | Frequency13-8 | Frequency13-9 |
| 12 | Frequency12-1 | Frequency12-2 | Frequency12-3 | Frequency12-4 | Frequency12-5 | Frequency12-6 | Frequency12-7 | Frequency12-8 | Frequency12-9 |
| 11 | Frequency11-1 | Frequency11-2 | Frequency11-3 | Frequency11-4 | Frequency11-5 | Frequency11-6 | Frequency11-7 | Frequency11-8 | Frequency11-9 |
| 10 | Frequency10-1 | Frequency10-2 | Frequency10-3 | Frequency10-4 | Frequency10-5 | Frequency10-6 | Frequency10-7 | Frequency10-8 | Frequency10-9 |
| 9 | Frequency 9-1 | Frequency 9-2 | Frequency 9-3 | Frequency 9-4 | Frequency 9-5 | Frequency 9-6 | Frequency 9-7 | Frequency 9-8 | Frequency 9-9 |
| 8 | Frequency 8-1 | Frequency 8-2 | Frequency 8-3 | Frequency 8-4 | Frequency 8-5 | Frequency 8-6 | Frequency 8-7 | Frequency 8-8 | Frequency 8-9 |
| 7 | Frequency 7-1 | Frequency 7-2 | Frequency 7-3 | Frequency 7-4 | Frequency 7-5 | Frequency 7-6 | Frequency 7-7 | Frequency 7-8 | Frequency 7-9 |
| 6 | Frequency 6-1 | Frequency 6-2 | Frequency 6-3 | Frequency 6-4 | Frequency 6-5 | Frequency 6-6 | Frequency 6-7 | Frequency 6-8 | Frequency 6-9 |
| 5 | Frequency 5-1 | Frequency 5-2 | Frequency 5-3 | Frequency 5-4 | Frequency 5-5 | Frequency 5-6 | Frequency 5-7 | Frequency 5-8 | Frequency 5-9 |
| 4 | Frequency 4-1 | Frequency 4-2 | Frequency 4-3 | Frequency 4-4 | Frequency 4-5 | Frequency 4-6 | Frequency 4-7 | Frequency 4-8 | Frequency 4-9 |
| 3 | Frequency 3-1 | Frequency 3-2 | Frequency 3-3 | Frequency 3-4 | Frequency 3-5 | Frequency 3-6 | Frequency 3-7 | Frequency 3-8 | Frequency 3-9 |
| 2 | Frequency 2-1 | Frequency 2-2 | Frequency 2-3 | Frequency 2-4 | Frequency 2-5 | Frequency 2-6 | Frequency 2-7 | Frequency 2-8 | Frequency 2-9 |
| 1 | Frequency 1-1 | Frequency 1-2 | Frequency 1-3 | Frequency 1-4 | Frequency 1-5 | Frequency 1-6 | Frequency 1-7 | Frequency 1-8 | Frequency 1-9 |

Rows 21 = Frame places; Rows 1–20 = Data places

Reception number frequency table

| Frequency 1 | Frequency 2 | Frequency 3 | Frequency 4 | Frequency 5 | Frequency 6 | Frequency 7 | Frequency 8 | Frequency 9 | Frequency 10 | Frequency 11 |
|---|---|---|---|---|---|---|---|---|---|---|
| Frequency 12 | Frequency 13 | Frequency 14 | Frequency 15 | Frequency 16 | Frequency 17 | Frequency 18 | Frequency 19 | Frequency 20 | Frequency 21 | Frequency 22 |

Since total 19 frequencies are generated, 19th frequency is generated as reception number frequency

IoT SWITCHGEAR OPERATION SYSTEM USING SOUND WAVE COMMUNICATION

CROSS-REFERENCE TO PRIOR APPLICATIONS

This application is a National Stage patent Application of PCT International Patent Application No. PCT/KR2020/005311 (filed on Apr. 22, 2020) under 35 U.S.C. § 371, which claims priority to Korean Patent Application No. 10-2019-0117751 (filed on Sep. 24, 2019), which are all hereby incorporated by reference in their entirety.

BACKGROUND

The present invention relates to an IoT switchgear operation system using sound wave communication, which can operate an IoT switchgear using sound waves.

Although services that link various IoT switchgears to a smartphone possessed by a user are spreading as the App Key market using the smartphone as a digital key grows, the services can be used only in a specific terminal equipped with corresponding H/W since existing techniques are driven based on H/W (BLE, Wi-Fi, NFC, etc.) embedded in the smartphone.

Accordingly, services using H/W embedded in an existing smartphone generate significant problems due to security of keys and issues of connection between the smartphone and the IoT switchgears.

Although most manufacturers provide communication with IoT switchgears using BLE or NFC among the H/W of smartphones to solve this problem, it is difficult to provide smooth services due to various problems such as security problems, connection and power consumption problems of IoT switchgears, and the like occurring recently.

Therefore, it is urgently required to develop IoT switchgears that can implement a digital key, enhance security, and minimize power consumption in all kinds of terminals, as well as specific terminals of specific manufacturers.

SUMMARY

The technical problem of the present invention is to control a secure IoT switchgear without connection of a separate relay server and H/W (BLE, Wi-Fi, etc.) using sound wave communication through a speaker of a smartphone.

To accomplish the above object, according to one aspect of the present invention, there is provided an IoT switchgear operation system using sound wave communication, the system comprising: a communication terminal 100 for requesting, from an IoT switchgear 200 through sound wave communication, any one or more operations among registration of a manager, registration of a user, transmission of a changed password, transmission of a user's one-time digital key for opening or closing an IoT switchgear 200 by the user himself or herself, and transmission of another user's one-time digital key for opening or closing the IoT switchgear 200 from a terminal of another user; and the IoT switchgear 200 for performing registration of a manager, registration of a user, change of a password, storage of the user's one-time digital key, and opening or closing of a door using another user's one-time digital key requested by the communication terminal 100 through sound wave communication with the communication terminal 100.

The communication terminal 100 may include one or more among: a manager registration frame generation module 110 for generating a manager registration frame, in which a unique PIN code indicating registration of a manager, manager access IP address information, and Wi-Fi connection information are recorded; a user registration frame generation module 120 for generating a user registration frame, in which a unique PIN code indicating registration of a user and a phone number of a user terminal having a right to use the IoT switchgear 200 are recorded; a change password frame generation module 130 for generating a change password frame, in which a unique PIN code indicating change of a password and a change password to be changed and registered in the IoT switchgear 200 are recorded; a user's one-time digital key frame generation module 140 for generating a user's one-time digital key frame, in which a unique PIN code indicating transmission of a one-time digital key and a user's one-time digital key are recorded; an another user's one-time digital key frame generation module 150 for generating an another user's one-time digital key frame, in which a unique PIN code indicating transmission of a one-time digital key and another user's one-time digital key are recorded; and a sound wave transmitter 160 for loading the manager registration frame, the user registration frame, the change password frame, the user's one-time digital key frame, and the another user's one-time digital key frame on a sound wave signal, and transmitting sound waves.

The IoT switchgear 200 may include: a sound wave receiver 210 for receiving the manager registration frame, the user registration frame, the change password frame, the user's one-time digital key frame, and the another user's one-time digital key frame through sound waves; a setting button 220 provided in the IoT switchgear 200; a manager registration module 230 for reading a PIN code field of a frame received by the sound wave receiver 210 when the setting button is pressed for a preset reference time or more, and extracting and storing manager access IP address information and Wi-Fi connection information from the manager registration frame received through the sound wave receiver 210 when a PIN code recorded in the PIN code field of the frame is a manager registration PIN code; a user registration module 240 for reading a PIN code field of a frame received by the sound wave receiver 210 when the setting button is pressed for a preset reference time or more, and extracting and storing a phone number of a user terminal from the user registration frame received through the sound wave receiver 210 when the PIN code recorded in the PIN code field of the frame is a user registration PIN code; a change password update module 250 for reading a PIN code field of a frame received by the sound wave receiver 210 when the setting button is pressed for a preset reference time or more, and extracting a changed phone number from the change password frame received through the sound wave receiver 210 and updating the password when the PIN code recorded in the PIN code field of the frame is a change password PIN code; a one-time digital key processing module 260 for performing opening or closing of a door using the user's one-time digital key or another user's one-time digital key received through the sound wave receiver 210 when a touch of the IoT switchgear 200 or a set sound wave band is detected; and a messaging push module 270 for transmitting an operating state of the IoT switchgear 200 to a manager terminal.

The manager registration frame may include one or more among: a PIN code field in which a unique manager registration identification PIN code distinguished from those of the other sound wave services is recorded; a manager terminal IP address field in which an IP address accessed by the manager terminal is recorded; a Wi-Fi SSID field in which an SSID of Wi-Fi accessed by the manager terminal is recorded; an SSID password field in which an access password for accessing the Wi-Fi is recorded; and a manager terminal phone number field in which a phone number of the manager terminal to be registered as a manager is recorded.

The manager registration module 230 may connect to Wi-Fi using the SSID recorded in the Wi-Fi SSID field of the manager registration frame received through the sound wave receiver 210 and the Wi-Fi access password recorded in the SSID password field, connect to the manager terminal IP address recorded in the manager terminal IP address field, and transmit the unique MAC address of the IoT switchgear 200 to the manager terminal. When connection to the Wi-Fi or connection to the manager terminal IP address fails, the switchgear may generate an alarm sound and return to sleep mode.

The user registration frame may include one or more among: a PIN code field in which a unique user registration identification PIN code distinguished from those of the other sound wave services is recorded; a manager password field in which a manager password input by the manager is recorded; and a user terminal phone number field in which a phone number of a user terminal having a right to open or close the IoT switchgear 200 is recorded.

The user registration module 240 may extract the manager password from the manager password field of the user registration frame received through the sound wave receiver 210, and when the extracted manager password matches a previously registered manager password, it may be updated and registered as a new user terminal recorded in the user registration frame, and when the manager password does not match, the switchgear may generate an alarm sound and return to sleep mode.

The update registration with a new user terminal may be recording the user terminal phone number recorded in the user terminal phone number field, the user password set by the user, and a time stamp at the time of setting the user password.

The change password frame may include one or more among: a PIN code field in which a unique change password identification PIN code distinguished from those of the other sound wave services is recorded; a current user password field in which a previously set current user password is recorded; a change user phone number field in which a phone number of the user terminal to be changed is recorded; and a change password field in which a password assigned to the user terminal and will be changed is recorded.

When the setting button is pressed for the set reference time or more, the IoT switchgear 200 may switch from sleep mode to wake-up mode, and extract valid data at a preset field position from the received frame, and when a valid data is not extracted, the switchgear may generate an alarm sound and return to sleep mode.

The user's one-time digital key may include one or more among: a PIN code field in which a unique one-time digital key identification PIN code distinguished from those of the other sound wave services is recorded; a classification code field in which a user's one-time code indicating that it is a user's one-time digital key used to open or close the IoT switchgear 200 by the user himself or herself is recorded; a user password field in which a user password is recorded; and a one-time digital key field in which an OTP-type one-time digital key configured of a user terminal phone number for generating a digital key and a time stamp at a time point of inputting the digital key is recorded.

The another user's one-time digital key may include one or more among: a PIN code field in which a unique one-time digital key identification PIN code distinguished from those of the other sound wave services is recorded; a classification code field in which another user's one-time code indicating that it is another user's one-time digital key used to open or close the IoT switchgear 200 from the terminal of another user is recorded; an IoT switchgear unique MAC address field in which a unique MAC address of the IoT switchgear 200 for performing sound wave communication is recorded, and a one-time digital key field in which an OTP-type one-time digital key configured of a user terminal phone number for generating a digital key and a time stamp at a time point of inputting the digital key is recorded.

The digital key processing module may perform verification of user's one-time digital key when the one-time digital key identification PIN code is recorded in the PIN code field of the frame and the user's one-time code is recorded in the classification code field of the frame, and when a PIN code of another user's one-time digital key is recorded in the PIN code field of the frame and another user's one-time code is recorded in the classification code field of the frame, the digital key processing module may perform verification of another user's one-time digital key.

For verification of user's one-time digital key, it may be confirmed whether the user terminal phone number recorded in the one-time digital key field of the user's one-time digital key frame is registered in the IoT switchgear 200, and when the user terminal phone number is registered, it may be primarily verified whether the user password recorded in the user password field of the user's one-time digital key frame matches a user password registered in the IoT switchgear 200. Then, the time of the time stamp received together with the phone number through the one-time digital key field of the user's one-time digital key frame may be compared with the time of the timestamp registered in the IoT switchgear 200, and when the time registered in the IoT switchgear 200 is a time earlier than the received time or is an initial timestamp time, secondary verification of confirming that the user's one-time digital key is a valid digital key of the user may be completed.

Here, for verification of another user's one-time digital key, it may be confirmed whether the user terminal phone number recorded in the one-time digital key field of the another user's one-time digital key frame is registered in the IoT switchgear 200, and when the user terminal phone number is registered, it may be primarily verified whether the IoT switchgear unique MAC address recorded in the IoT switchgear unique MAC address field of the another user's one-time digital key frame matches the IoT switchgear unique MAC address recorded in the IoT switchgear 200. Then, the time of the time stamp received together with the phone number through the one-time digital key field of the another user's one-time digital key frame may be compared with the time of the timestamp registered in the IoT switchgear 200, and when the time registered in the IoT switchgear 200 is a time earlier than the received time or is an initial timestamp time, secondary verification of confirming that the another user's one-time digital key is a valid digital key of the user may be completed.

According to an embodiment of the present invention, although the steps of setting Wi-Fi connection are very complicated and difficult for existing IoT switchgears 200, since a method using sound wave communication has an advantage of easily exchanging connection information between devices, even a user without specialized knowledge may simply connect a device.

In addition, according to an embodiment of the present invention, as a sound source file is directly delivered or a URL of the sound source file is delivered when a one-time key is delivered through an SNS, the one-time key can be transmitted without installing a dedicated app.

BRIEF DESCRIPTION OF THE DRAWINGS

FIG. 3 is a view showing an example of a manager registration frame according to an embodiment of the present invention.

FIG. 4 is a view showing an example of a user registration frame according to an embodiment of the present invention.

FIG. 5 is a view showing an example of a change password frame according to an embodiment of the present invention.

FIG. 6 is a view showing an example of a user's one-time digital key frame according to an embodiment of the present invention.

FIG. 7 is a view showing an example of an another user's one-time digital key frame according to an embodiment of the present invention.

FIGS. 15 and 16 are views showing exemplary tables of a decimal number transmission method according to an embodiment of the present invention.

DETAILED DESCRIPTION

Hereinafter, the advantages and features of the present invention and a method of achieving them will be clear with reference to the embodiments described below in detail in conjunction with the accompanying drawings. However, the present invention is not limited to the embodiments disclosed below, but will be implemented in various different forms, and is provided to fully inform those skilled in the art of the scope of the present invention, and the present invention is only defined by the scope of the claims. In addition, when it is determined that related known techniques may obscure the gist of the present invention in describing the present invention, the detailed description thereof will be omitted.

Figure 1:
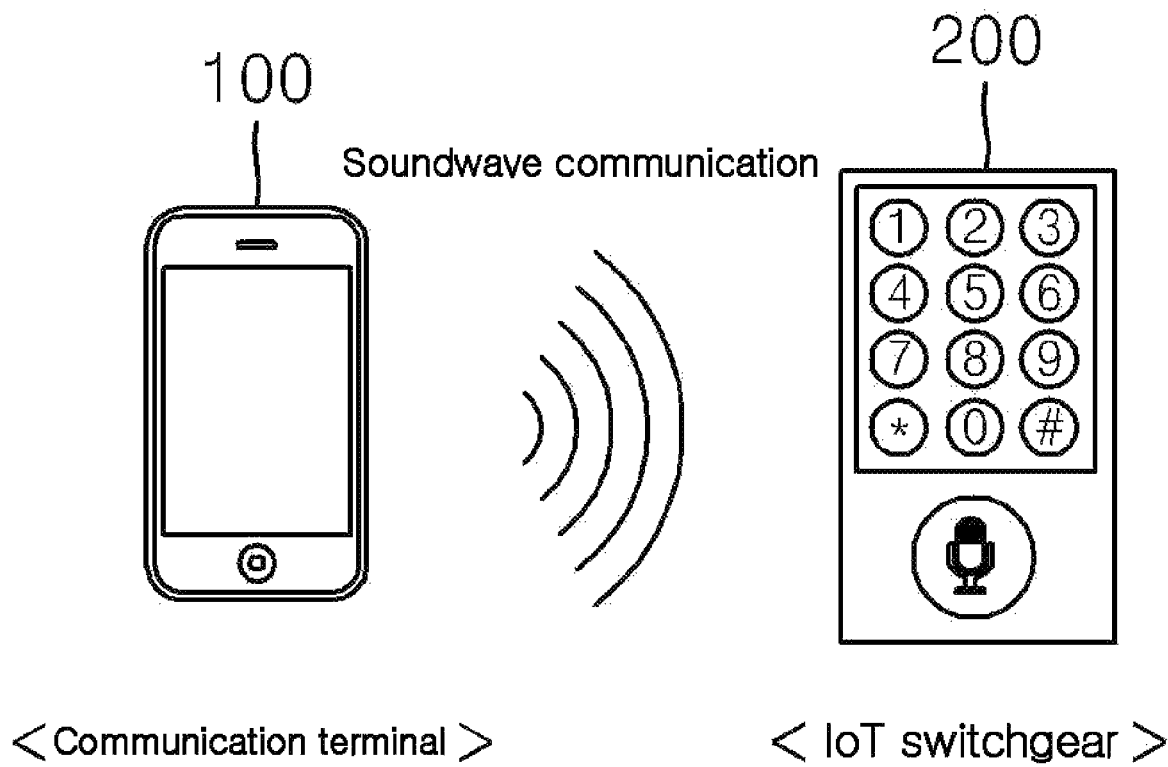
FIG. 1 is a view showing the configuration of an IoT switchgear operation system using sound wave communication according to an embodiment of the present invention.
Figure 2:
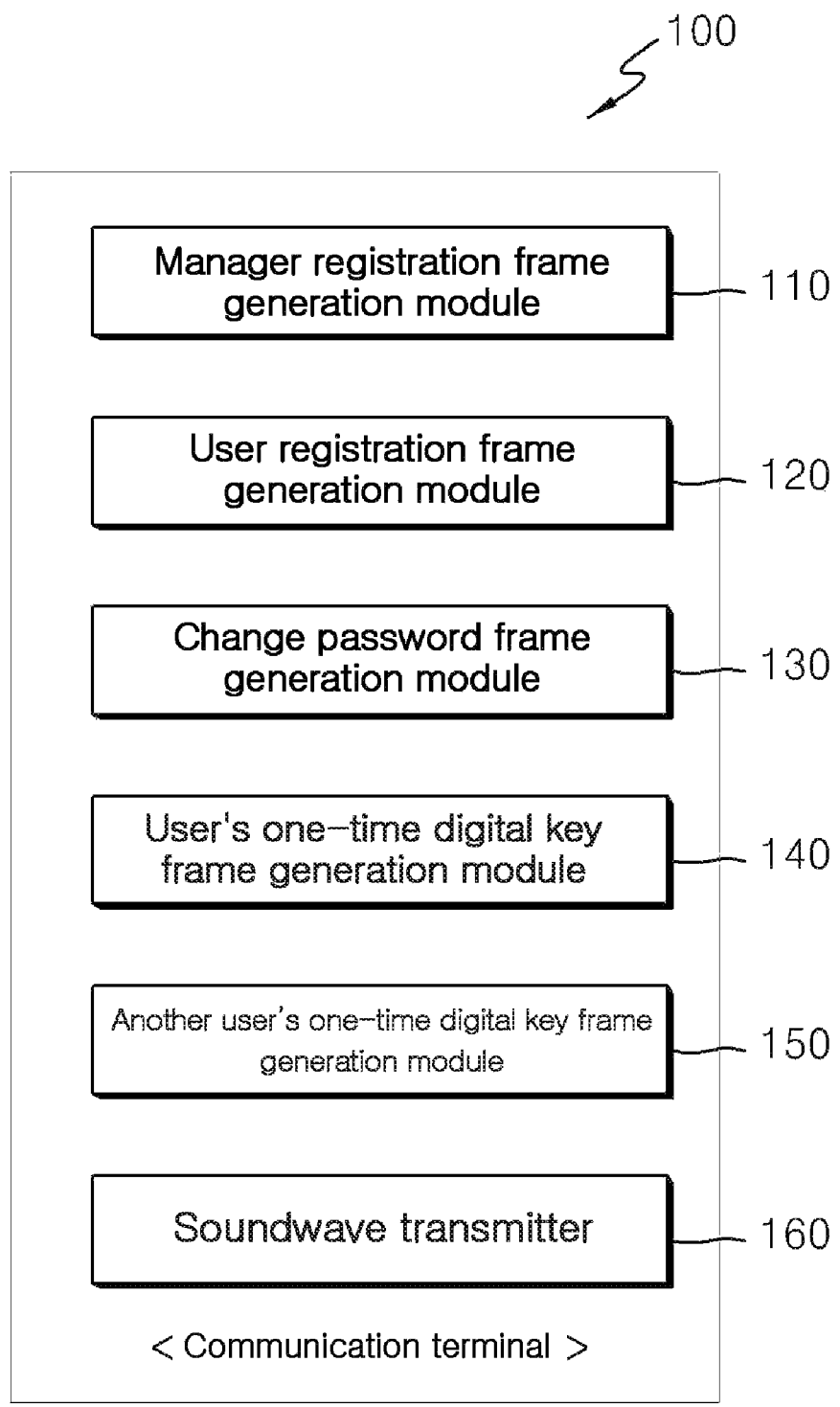
FIG. 2 is a block diagram showing the configuration of a communication terminal 100 according to an embodiment of the present invention.
Figure 8:
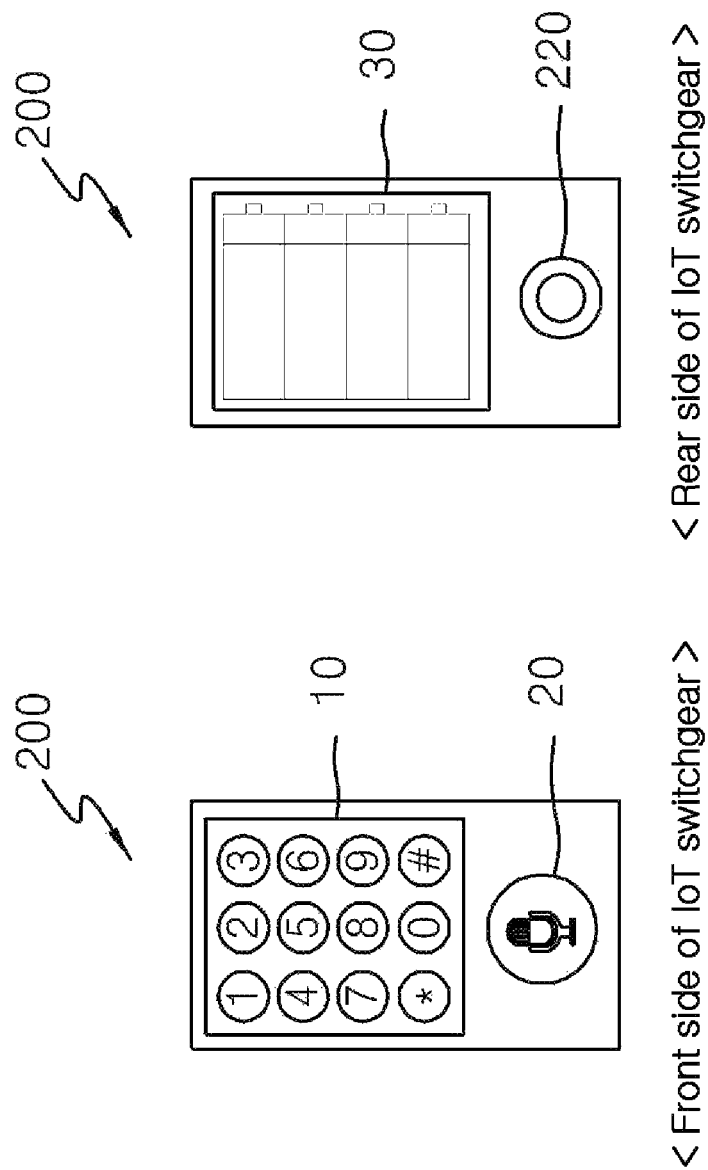
FIG. 8 is a view showing the front side and rear side of an IoT switchgear 200 according to an embodiment of the present invention.
Figure 9:
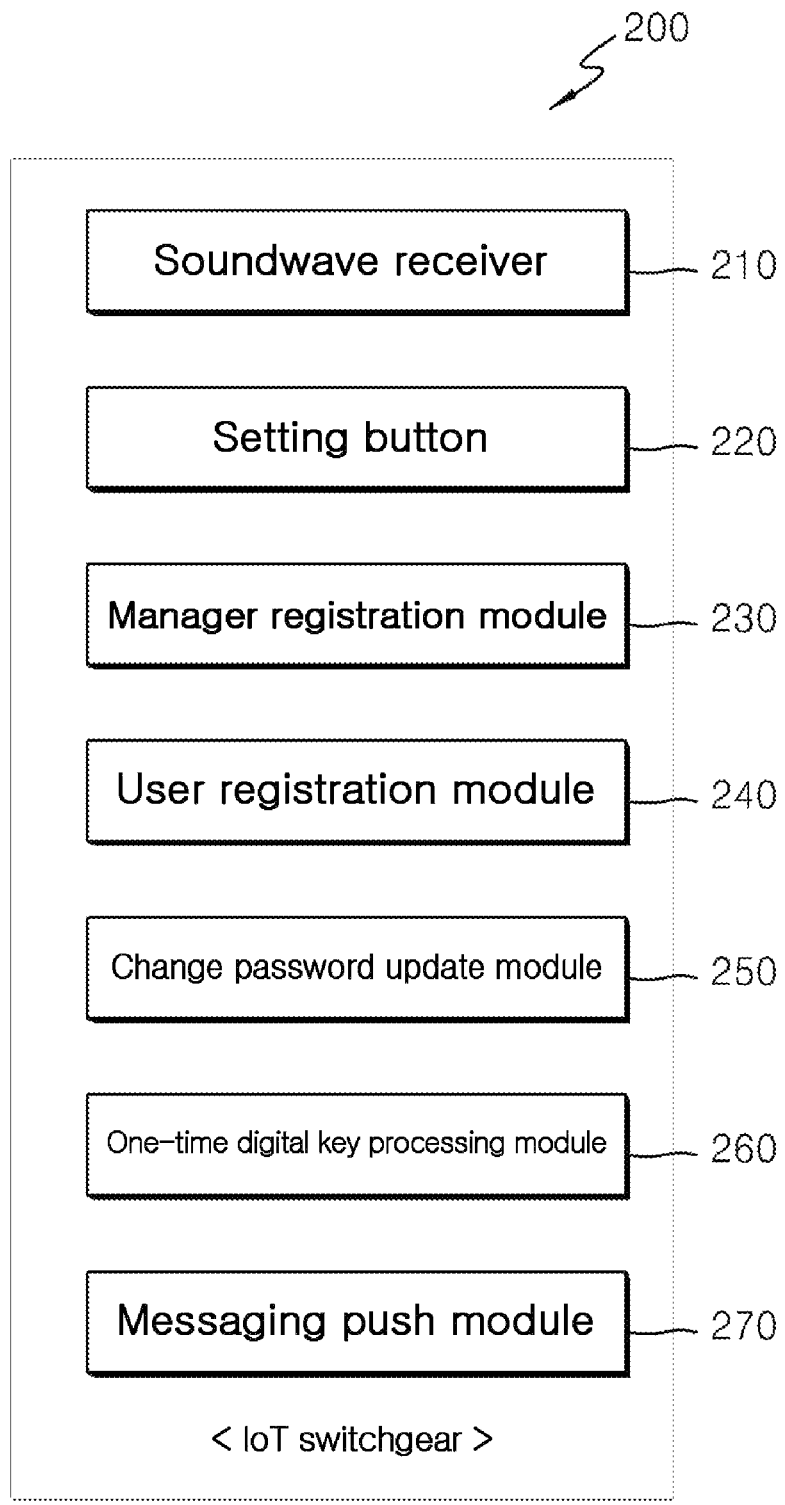
FIG. 9 is a block diagram showing the configuration of an IoT switchgear 200 according to an embodiment of the present invention.
Figure 10:
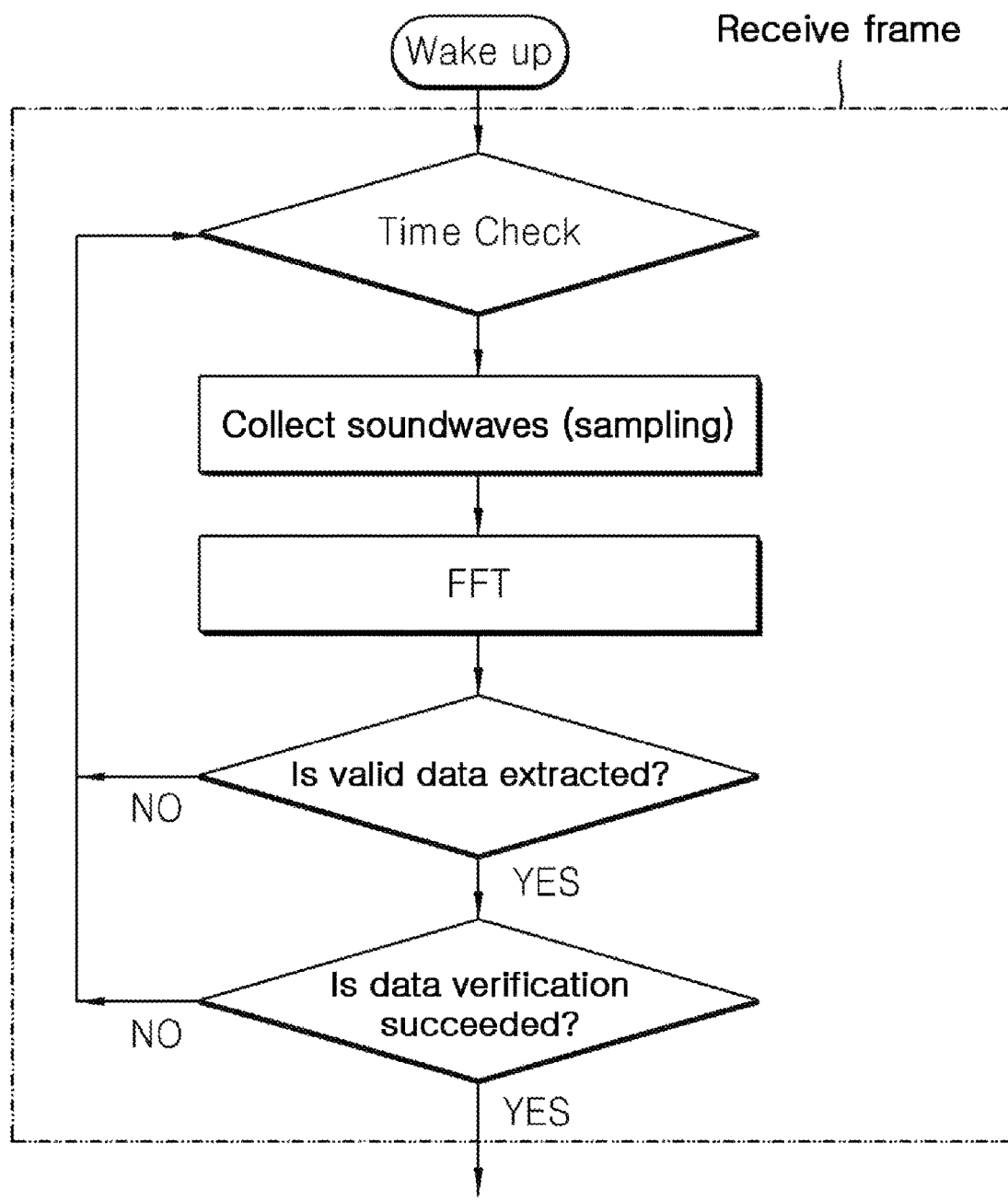
FIG. 10 is a flowchart illustrating an example of extracting and verifying data on the basis of sound wave reception according to an embodiment of the present invention.
Figure 11:
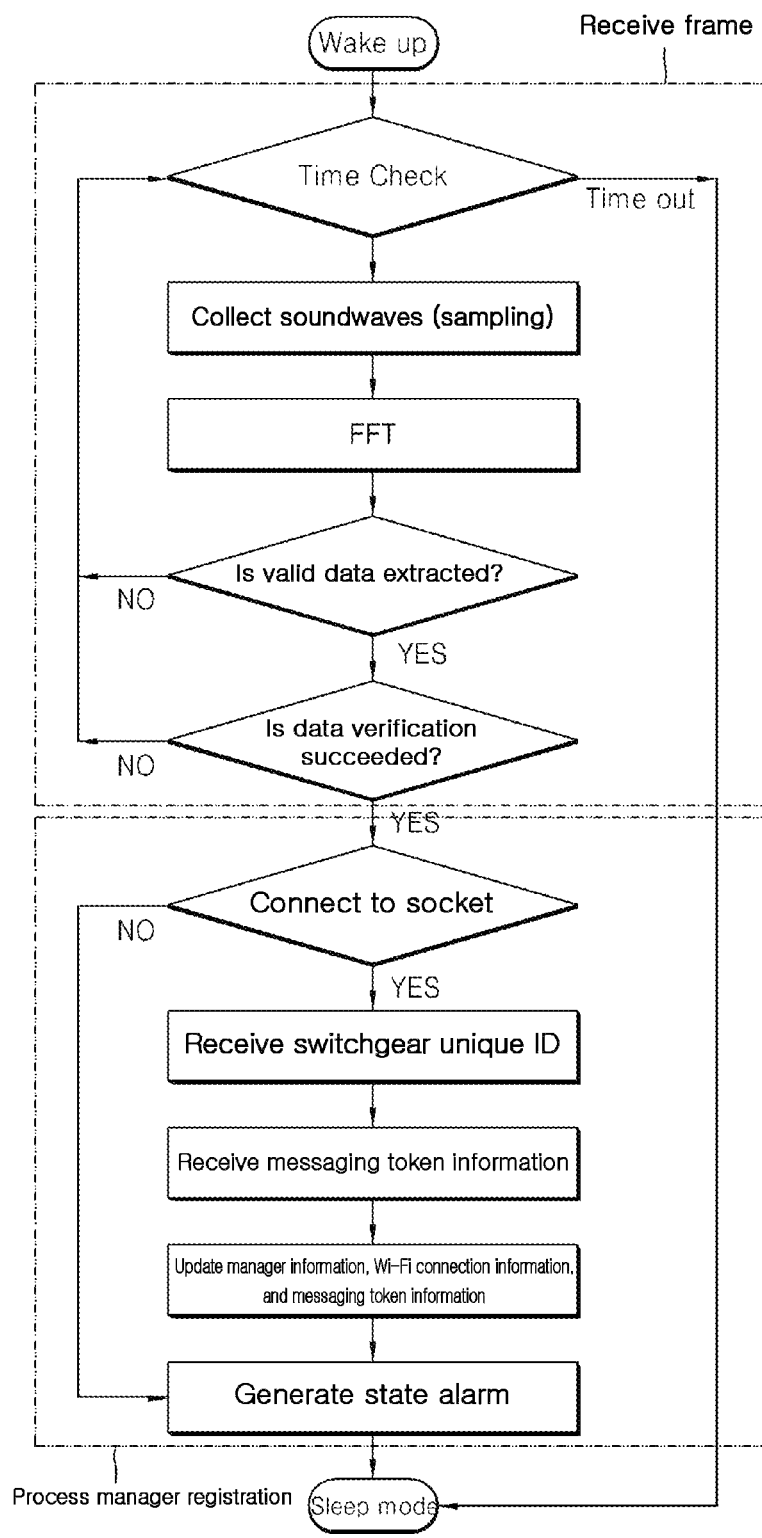
FIG. 11 is a flowchart illustrating an example of registering of a manager according to an embodiment of the present invention.
Figure 12:
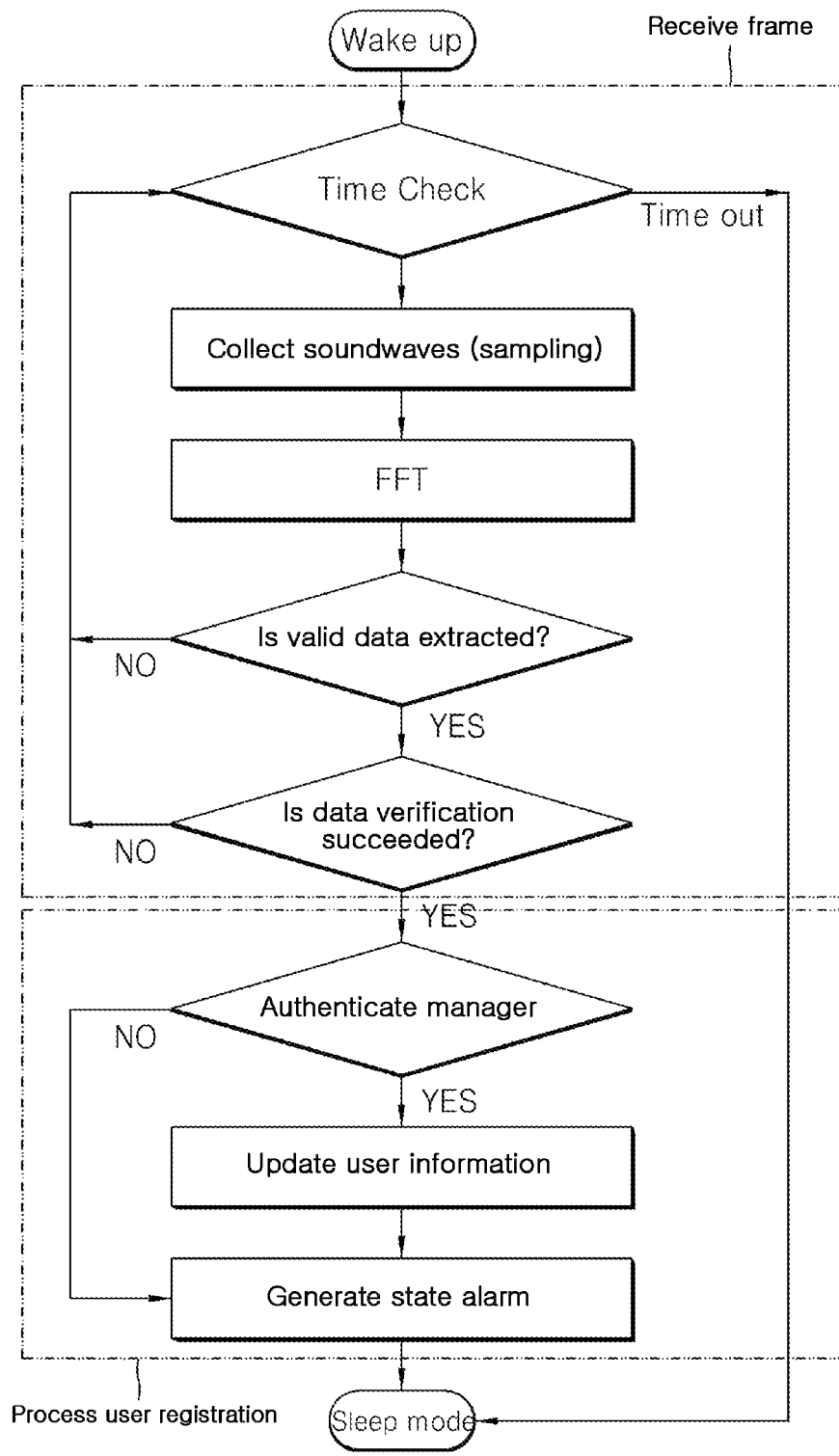
FIG. 12 is a flowchart illustrating an example of registering of a user according to an embodiment of the present invention.
Figure 13:
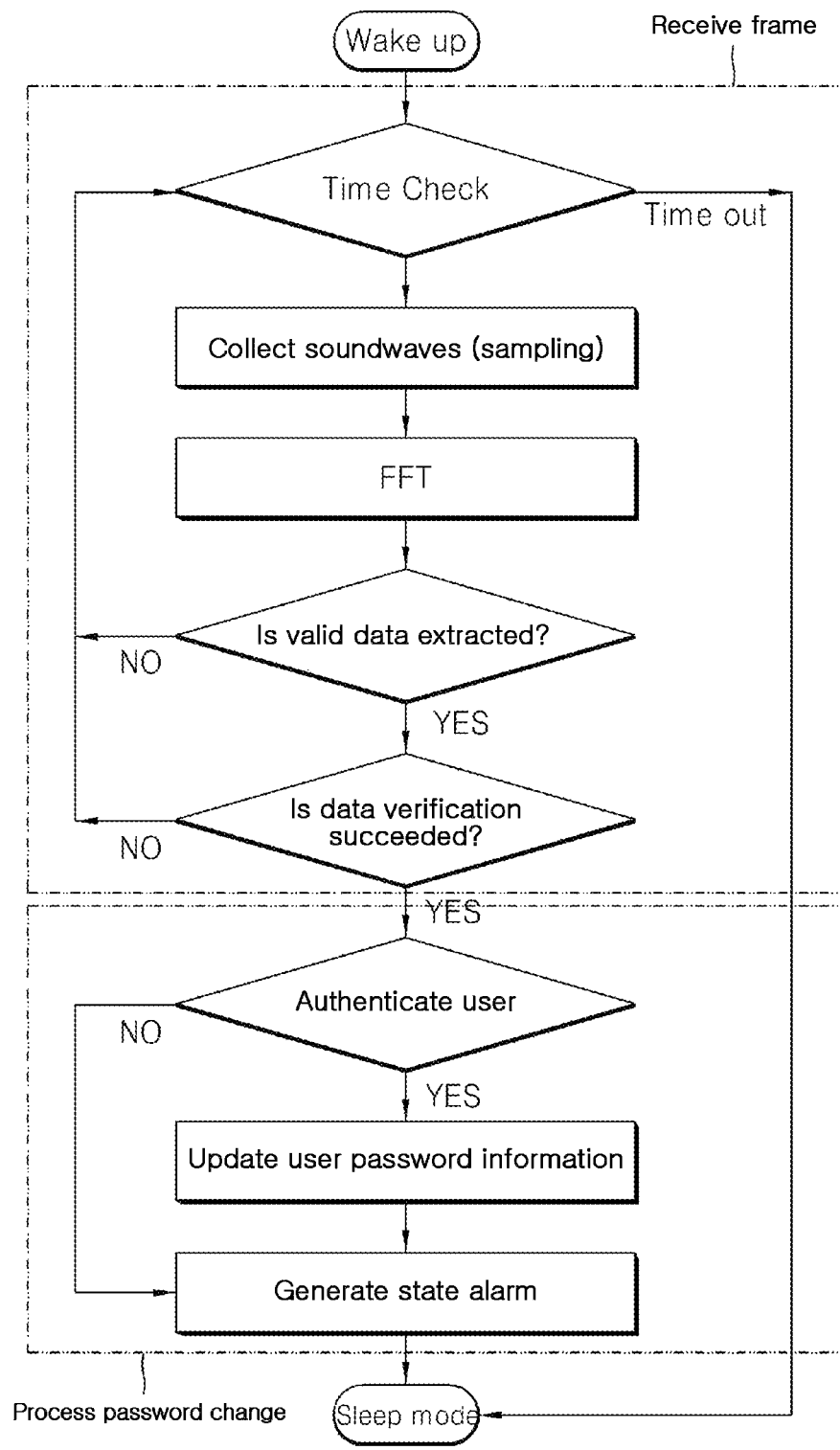
FIG. 13 is a flowchart illustrating an example of changing a password according to an embodiment of the present invention.
Figure 14:
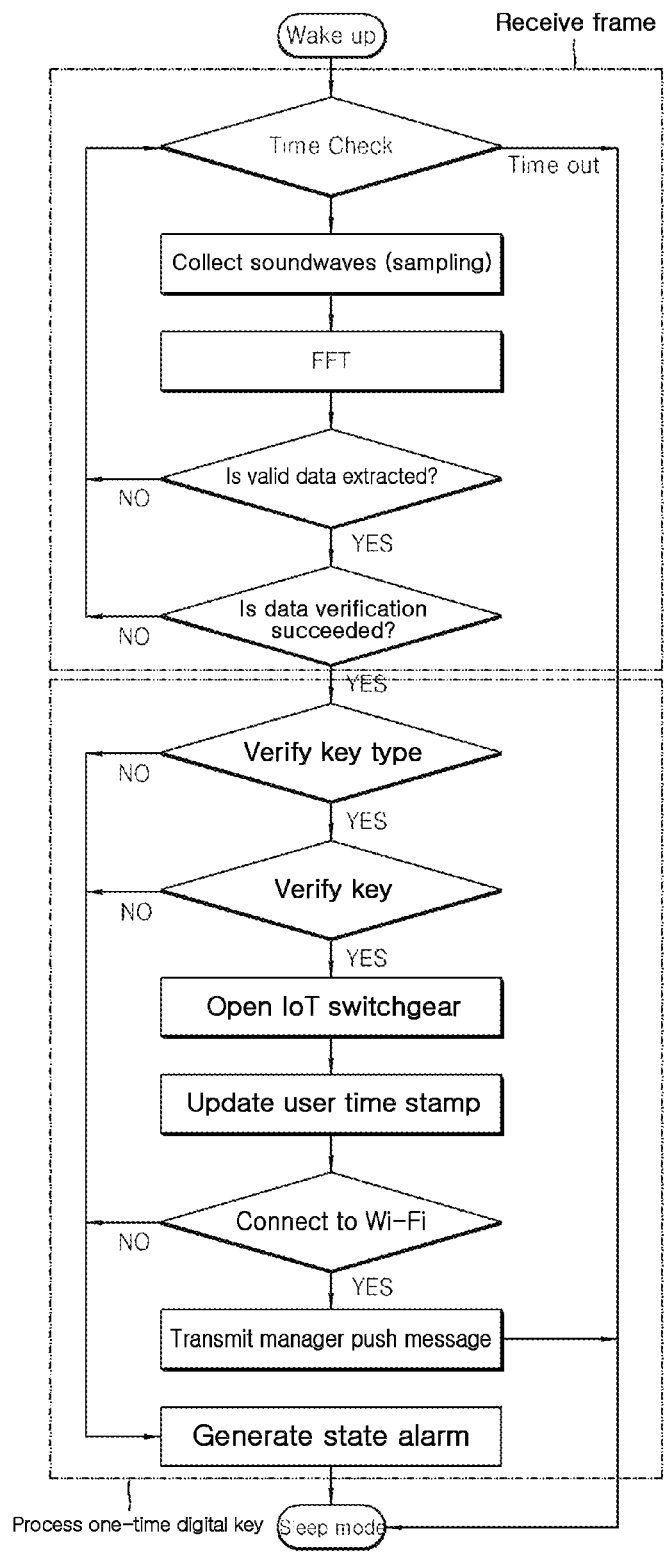
FIG. 14 is a flowchart illustrating an example of processing a digital key according to an embodiment of the present invention.

FIG. 1 is a view showing the configuration of an IoT switchgear operation system using sound wave communication according to an embodiment of the present invention, FIG. 2 is a block diagram showing the configuration of a communication terminal 100 according to an embodiment of the present invention, FIG. 3 is a view showing an example of a manager registration frame according to an embodiment of the present invention, FIG. 4 is a view showing an example of a user registration frame according to an embodiment of the present invention, FIG. 5 is a view showing an example of a change password frame according to an embodiment of the present invention, FIG. 6 is a view showing an example of a user's one-time digital key frame according to an embodiment of the present invention, FIG. 7 is a view showing an example of an another user's one-time digital key frame according to an embodiment of the present invention, FIG. 8 is a view showing the front side and rear side of an IoT switchgear 200 according to an embodiment of the present invention, FIG. 9 is a block diagram showing the configuration of an IoT switchgear 200 according to an embodiment of the present invention, FIG. 10 is a flowchart illustrating an example of extracting and verifying data on the basis of sound wave reception according to an embodiment of the present invention, FIG. 11 is a flowchart illustrating an example of registering of a manager according to an embodiment of the present invention, FIG. 12 is a flowchart illustrating an example of registering of a user according to an embodiment of the present invention, FIG. 13 is a flowchart illustrating an example of changing a password according to an embodiment of the present invention, FIG. 14 is a flowchart illustrating an example of processing a digital key according to an embodiment of the present invention, and FIGS. 15 and 16 are views showing exemplary tables of a decimal number transmission method according to an embodiment of the present invention.

The present invention makes it possible to directly open or close an IoT switchgear without connection of a separate relay server and H/W (BLE, Wi-Fi, etc.) using sound wave communication through a speaker of a smartphone.

To this end, as shown in FIG. 1, a communication terminal 100 such as a smartphone, and an IoT switchgear 200 such as a door lock or the like may be included.

Although a smartphone is described in the drawings as an example, the communication terminal 100 may include a tablet PC, a slate PC, and a Portable Multimedia Player (PMP), as well as the smartphone. Of course, the terminal to which the present invention can be applied is not limited to the types described above, and it is natural that all terminals capable of performing wireless communication with an external device may be included.

The communication terminal 100 may request, from the IoT switchgear 200 through sound wave communication, any one or more operations among registration of a manager, registration of a user, transmission of a changed password, transmission of a user's one-time digital key for opening or closing the IoT switchgear 200 by the user himself or herself, and transmission of another user's one-time digital key for opening or closing the IoT switchgear 200 from the terminal of another user.

Here, the sound wave signal used in the sound wave communication is a signal in a sound wave frequency band, e.g., between 18,000 and 19,800 Hz. This frequency band is a frequency signal inaudible to people since it is not a sound wave in an audible frequency band that humans can hear.

Accordingly, registration of a manager, registration of a user, transmission of a changed password, transmission of a user's one-time digital key for opening or closing the IoT switchgear 200 by the user himself or herself, transmission of another user's one-time digital key for opening or closing the IoT switchgear 200 from the terminal of another user or the like is performed using a signal in the frequency band of this inaudible sound wave.

To this end, the communication terminal 100 may include, as shown in FIG. 2, a manager registration frame generation module 110, a user registration frame generation module 120, a change password frame generation module 130, a user's one-time digital key frame generation module 140, an another user's one-time digital key frame generation module 150, and a sound wave transmitter 160.

The manager registration frame generation module 110 generates a frame for transmitting Wi-Fi (SSID and Password) information for accessing the IoT switchgear 200 and information on a manager terminal (IP address of the same Wi-Fi and a mobile phone number) to the switchgear as a sound wave. To this end, the manager registration frame generation module 110 is a module for generating a manager registration frame, in which a unique PIN code indicating registration of a manager not to be overlapped with other sound wave services, manager access IP address information, and Wi-Fi connection information are recorded.

Here, the manager registration frame may include, as shown in FIG. 3, a PIN code field in which a unique manager registration identification PIN code distinguished from those of the other sound wave services is recorded, a manager terminal IP address field in which an IP address accessed by the manager terminal is recorded, a Wi-Fi SSID field in which an SSID of Wi-Fi accessed by the manager terminal is recorded, an SSID password field in which an access password for accessing the Wi-Fi is recorded, and a manager terminal phone number field in which a phone number of the manager terminal to be registered as a manager is recorded. For reference, information on the configuration of the fields of the manager registration frame is negotiated in advance between the communication terminal 100 and the IoT switchgear 200, and this is also applied to a user registration frame, a change password frame, a user's one-time digital key frame, and an another user's one-time digital key frame, which will be described below.

The IoT switchgear 200 receiving the manager registration frame through sound wave communication may attempt Wi-Fi connection using the received Wi-Fi information, and when connection to the Wi-Fi is normally performed, the IoT switchgear may easily set more information through a Wi-Fi connection to the received 12-digit IP address (of the manager terminal). Accordingly, although the steps of setting Wi-Fi connection are very complicated and difficult for existing IoT switchgears 200, since a method using sound wave communication has an advantage of easily exchanging connection information between devices, even a user without specialized knowledge may simply connect a device.

The user registration frame generation module 120 is a module for generating a frame for transmitting information for the manager to register a user in the IoT switchgear 200 by delivering a phone number of a terminal to be used as a digital key to the IoT switchgear 200. To this end, the user registration frame generation module 120 generates a user registration frame, in which a unique PIN code indicating registration of a user and a phone number of a user terminal having a right to use the IoT switchgear 200 are recorded. Here, the user registration frame may include, as shown in FIG. 4, a PIN code field in which a unique user registration identification PIN code distinguished from those of the other sound wave services is recorded, a manager password field in which a manager password input by the manager is recorded, and a user terminal phone number field in which a phone number of a user terminal having a right to open or close the IoT switchgear 200 is recorded. Here, the manager password is a 15-digit password of the manager registered in the IoT switchgear, and the user terminal phone number may be registered to have up to a maximum of 20 digits per phone number and added to the frame as many as registered users.

The change password frame generation module 130 is a module for generating a frame for transmitting information for changing a password corresponding to the phone number of a user. To this end, the change password frame generation module 130 generates a change password frame, in which a unique PIN code indicating change of a password not to be overlapped with other sound wave services, and a change password to be changed and registered in the IoT switchgear 200 are recorded. Here, the change password frame may include, as shown in FIG. 5, a PIN code field in which a unique change password identification PIN code distinguished from those of the other sound wave services is recorded, a current user password field in which a previously set current user password is recorded, a change user phone number field in which a phone number of the user terminal to be changed is recorded, and a change password field in which a password assigned to the user terminal and will be changed is recorded. For example, a 15-digit current password previously stored for the user phone number may be recorded in the current user password field, and a 15-digit password to be changed for the user phone number may be recorded in the change password field.

The user's one-time digital key frame generation module 140 generates a frame for transmitting a digital key sound wave that transmits an OTP-type one-time digital key to open the IoT switchgear. To this end, the user's one-time digital key frame generation module 140 generates a user's one-time digital key frame, in which a unique PIN code indicating transmission of a one-time digital key and a user's one-time digital key are recorded.

Here, the user's one-time digital key frame may include, as shown in FIG. 6, a PIN code field in which a unique one-time digital key identification PIN code distinguished from those of the other sound wave services is recorded, a classification code field in which a user's one-time code indicating that it is a user's one-time digital key used to open or close the IoT switchgear 200 by the user himself or herself is recorded, a user password field in which a user password is recorded, and a one-time digital key field in which an OTP-type one-time digital key configured of a user terminal phone number for generating a digital key and a time stamp at the time point of inputting the digital key is recorded. Particularly, the OTP-type one-time digital key is recorded in the one-time digital key field, and this is generating and recording a one-time digital key so that the digital key may not be copied and used as the time stamp is changed when the digital key is generated.

The another user's one-time digital key frame generation module 150 generates a one-time key to open or close the IoT switchgear 200 in a limited manner from the smartphone of a specific user without a dedicated app installed therein. Accordingly, as a sound source file is directly delivered or a URL of the sound source file is delivered when a corresponding one-time key is delivered through an SNS, a sound source may be transmitted without installing a dedicated app. To this end, the another user's one-time digital key frame generation module 150 generates an another user's one-time digital key frame, in which a unique PIN code indicating transmission of a one-time digital key and another user's one-time digital key are recorded.

Here, the another user's one-time digital key frame may include, as shown in FIG. 7, a PIN code field in which a unique one-time digital key identification PIN code distinguished from those of the other sound wave services is recorded, a classification code field in which another user's one-time code indicating that it is another user's one-time digital key used to open or close the IoT switchgear 200 from the terminal of another user is recorded, an IoT switchgear unique MAC address field in which a unique MAC address of the IoT switchgear 200 for performing sound wave communication is recorded, and a one-time digital key field in which an OTP-type one-time digital key configured of a user terminal phone number for generating a digital key and a time stamp at the time point of inputting the digital key is recorded. For example, the unique MAC address of the IoT switchgear 200 may use the unique number of a terminal IC received from the device when the manager registers the IoT switchgear 200.

As a sound source file is directly delivered or a URL of the sound source file is delivered when a corresponding one-time key is delivered through an SNS, a sound source may be used without installing a dedicated app.

The sound wave transmitter 160 performs a function of loading the manager registration frame, the user registration frame, the change password frame, the user's one-time digital key frame, and the another user's one-time digital key frame on a sound wave signal, and transmitting sound waves.

For reference, as is known, sound wave communication may perform communication with a power lower than that of RF communication such as Bluetooth communication or the like. The sound wave communication uses Binary Frequency Shift Keying (BFSK) modulation and continuous waveform (CW) modulation such as Amplitude Shift Keying (ASK) to transmit data as a sound wave signal. The BFSK modulation method is a method of assigning 0 and 1 to two specific frequency sound waves, and the CW modulation method a method of assigning 1 when a sound of a specific intensity or higher lasts for a specific period of time or more, and assigning 0 when a state without a sound lasts for a specific period of time or more regardless of frequency. Communications performed in these modulation methods may transmit only one bit of data on the two types of sound waves during a specific unit time. Since the sound wave used in a general mobile communication terminal has a frequency considerably lower than that of a radio wave, a unit time, which is a period of time for distinguishing a data string to be transmitted, is considerably longer than that of the radio wave. Therefore, since the transmission speed is inevitably low when only one bit is transmitted during the unit time using only two types of sound waves, the communication should be performed using a sound wave having various frequency sounds, rather than the two types of sound waves. That is, communication is performed by determining a pitch frequency used in music as a frequency sound that is used, matching a data digital value to each pitch frequency, and transmitting and decoding various frequency sounds. In this way, a plurality of bits is transmitted per unit time. However, the transmission speed may be low and transmission errors may occur in the case of conventional sound wave communication, and to solve this problem, the method of Korean Patent Registration No. 10-1568314 applied by the applicant of the present invention may be used, which can correct errors generated due to hardware characteristics and accurately receive data transmitted from a nearest place even when a plurality of sound waves is overlapped. Of course, publicized other various sound wave communication methods may be used.

The IoT switchgear 200 is a door lock switchgear as shown in FIG. 8, and a microphone 20 for receiving transmitted sound waves and a key button 10 for receiving key inputs are provided on the front side, and a battery storage box 30 and a setting button 220 on the rear side.

The IoT switchgear 200 performs operations such as registration of a manager, registration of a user, change of a password, storage of a user's one-time digital key, storage of another user's one-time digital key, opening and closing of a door, and the like requested from the communication terminal 100 through sound wave communication. In addition, the IoT switchgear 200 generates a state alarm that can be distinguished by sound, such as an error occurrence alarm, a registration completion alarm or the like, and performs an operation of sleep mode, which is a power saving mode.

To this end, the IoT switchgear 200 may include, as shown in FIG. 9, a sound wave receiver 210, a setting button 220, a manager registration module 230, a user registration module 240, a change password update module 250, a one-time digital key processing module 260, and a messaging push module 270.

The setting button 220 is provided in the IoT switchgear 200, and when the setting button is pressed by the user for a preset reference time or more, the PIN code field of a frame received by the sound wave receiver 210 is read. That is, when the setting button of the IoT switchgear 200 is pressed for a reference time or more and the IoT switchgear 200 wakes up, the sound wave receiver 210 is activated for a set period of time (e.g., 30 seconds). When the setting button is pressed for the set reference time or more, the IoT switchgear 200 switches from sleep mode to wake-up mode, and extracts valid data at a preset field position from the received frame, and when a valid data is not extracted, the switchgear generates an alarm sound and returns to sleep mode.

The sound wave receiver 210 receives the manager registration frame, the user registration frame, the change password frame, the user's one-time digital key frame, and the another user's one-time digital key frame through sound waves. That is, the sound wave receiver 210 senses a sound wave signal through a microphone, and generates a frame data by demodulating the sensed sound wave signal. As shown in FIG. 11, analog sound wave signals collected through the microphone are sampled at a specific sampling rate specified by the sound wave transmitter 160 of the user terminal and collected in the MCU's memory queue [queue: FIFO (First-In First-Out)], and data are extracted in real-time, and this process is repeated for a specified period of time until a data frequency is detected. When a data is not extracted for a specified period of time, the IoT switchgear 200 generates an alarm (state notification beep sound), and switches to the sleep mode.

The manager registration module 230 reads the PIN code field of the frame received by the sound wave receiver 210 when the setting button is pressed for a preset reference time or more, and when the PIN code recorded in the PIN code field of the frame is a manager registration PIN code, the manager registration module 230 determines the received frame as a manager registration frame, and extracts and stores manager access IP address information and Wi-Fi connection information from the manager registration frame received through the sound wave receiver 210 as shown in FIG. 11. Therefore, the manager registration module 230 connects to the Wi-Fi using the SSID recorded in the Wi-Fi SSID field of the manager registration frame received through the sound wave receiver 210 and the Wi-Fi access password recorded in the SSID password field, connects to the manager terminal IP address recorded in the manager terminal IP address field, and transmits the unique MAC address of the IoT switchgear 200 to the manager terminal. When connection to the Wi-Fi or connection to the manager terminal IP address fails, the switchgear generates an alarm sound and returns to sleep mode.

The user registration module 240 reads the PIN code field of the frame received by the sound wave receiver 210 when the setting button is pressed for a preset reference time or more, and when the PIN code recorded in the PIN code field of the frame is a user registration PIN code, the user registration module 240 extracts and stores the phone number of the user terminal from the user registration frame received through the sound wave receiver 210. To this end, as shown in FIG. 12, the user registration module 240 extracts the manager password from the manager password field of the user registration frame received through the sound wave receiver 210, and when the extracted manager password matches a previously registered manager password, the user is updated and registered with a new user terminal recorded in the user registration frame, and when the manager password does not match, the switchgear generates an alarm sound and returns to sleep mode.

Here, the update registration with a new user terminal may be performed by recording the user terminal phone number recorded in the user terminal phone number field, the user password set by the user, and a time stamp at the time of setting the user password. The password and the timestamp set and used by the user when the user initially authenticates the IoT switchgear with a digital key may be set as the user password and the timestamp, and as the switchgear enters a password change mode, individual users may change registration of password at any time.

When manager authentication is completed, a user list stored in the flash memory (not shown) provided in the IoT switchgear 200 is initialized, and a received new user is registered. Therefore, a user may be registered in the flash memory of the IoT switchgear 200 in the structure shown below.

TABLE 1

| No. | User phone number | User password (initially 0) | Time stamp (initially 0) |
|---|---|---|---|
| | | | |

The change password update module 250 reads the PIN code field of the frame received by the sound wave receiver 210 when the setting button is pressed for a preset reference time or more, and when the PIN code recorded in the PIN code field of the frame is a change password PIN code, the change password update module 250 extracts a changed phone number from the change password frame received through the sound wave receiver 210, and updates the password. As shown in FIG. 13, when the setting button on the rear side of the IoT switchgear 200 is pressed for a predetermined period of time, the IoT switchgear 200 wakes up from the sleep mode and activates a password change sound wave reception mode. When the change password frame is received from the microphone of the IoT switchgear 200, corresponding information of the user stored in an internal storage (flash memory) is updated. That is, when data verification is completed, and the password corresponding to the phone number of the user stored in the IoT switchgear matches the received current password, the password is updated with the received change password and stored in the internal storage. On the other hand, when there is no phone number matching the received phone number of the user or the current password does not match, the switchgear generates a state alarm and enters the sleep mode.

When a touch of the IoT switchgear 200 or a set sound wave band is detected, the one-time digital key processing module 260 performs opening of the door of the IoT switchgear 200 as shown in FIG. 14 using the user's one-time digital key frame or another user's one-time digital key received through the sound wave receiver 210. A stored one-time digital key is used for verification of opening or closing through the key button of the IoT switchgear 200. To this end, the digital key processing module performs verification of the user's one-time digital key when the one-time digital key identification PIN code is recorded in the PIN code field of the frame and the user's one-time code is recorded in the classification code field of the frame. Here, the OTP-type user's one-time digital key is used to open the IoT switchgear 200 by the user, and the OTP-type another user's one-time digital key is a one-time key for opening or closing the IoT switchgear 200 in a limited manner from the smartphone of a specific user without a dedicated app installed therein.

It is confirmed whether the PIN code recorded in the PIN code field of the frame is a valid PIN code, and when it is a valid PIN code, it is confirmed whether the classification code field in the 5th field is received as 1 or 2, and when the received code matches, the received data is parsed and stored in a memory variable as follows.

Pin code=1st to 4th data of Frame 1
Classification code=5th data of Frame 1
Password=6th to 20th data of Frame 1
User phone number+OTP code (time stamp)=Frame 2

When the received code does not match, it is recognized as an incorrect key, and the switchgear generates a state alarm and enters the sleep mode.

For example, when the received code matches and the classification code is 1, i.e., user's one-time code, it is recognized as a digital key transmitted by the user, and when the classification code is 2, i.e., another user's one-time code, it is classified as an instance (one-time) key provided by the user for another user.

For verification of the digital key, when the classification code is 1, i.e., user's one-time code, verification of user's digital key is performed, and when the classification code is 2, i.e., another user's one-time code, instance (one-time) key verification is performed.

When a user's one-time code is recorded in the classification code field, for verification of the user's one-time digital key, it is confirmed whether the user terminal phone number recorded in the one-time digital key field of the user's one-time digital key frame is registered in the IoT switchgear 200, and when the user terminal phone number is registered, it is primarily verified whether the user password recorded in the user password field of the user's one-time digital key frame matches a user password registered in the IoT switchgear 200. Then, the time of the time stamp received together with the phone number through the one-time digital key field of the user's one-time digital key frame is compared with the time of the timestamp registered in the IoT switchgear 200, and when the time registered in the IoT switchgear 200 is a time earlier than the received time or is an initial timestamp time, secondary verification of confirming that the user's one-time digital key is a valid digital key of the user is completed. When the key verification is completed, the IoT switchgear 200 is opened.

Describing in detail, it is confirmed whether there is a user registered in the IoT switchgear 200 using a corresponding phone number. When there is a phone number of the user, it is confirmed whether the password registered in the IoT switchgear 200 using the user phone number is the same as the received password. When the same password is received or registered in the IoT switchgear as an initial password code, it is recognized that the user has transmitted the digital key for the first time, and the process proceeds to the next step. The time of the timestamp received together with the phone number is compared with the time of the time stamp registered in the IoT switchgear 200, and when the time registered in the IoT switchgear 200 is earlier than the received time or is an initial timestamp time, verification is completed confirming that the digital key is a valid digital key of the user. When the verification fails, the digital key is recognized as incorrect, and the switchgear generates a state alarm and enters sleep mode. When the key verification is completed, the IoT switchgear 200 is opened, and when an initial user digital key is received through digital key information after the IoT switchgear 200 is opened, the password of the user is updated. The timestamp of the user is updated with the received timestamp. Since the timestamp is updated at all times, it is impossible to record the digital key or reuse a key issued for one-time use only.

In addition, when the PIN code of another user's one-time digital key is recorded in the PIN code field of the frame and another user's one-time code is recorded in the classification code field of the frame, the digital key processing module performs verification of another user's one-time digital key.

Here, for verification of another user's one-time digital key, it is confirmed whether the user terminal phone number recorded in the one-time digital key field of the another user's one-time digital key frame is registered in the IoT switchgear 200, and when the user terminal phone number is registered, it is primarily verified whether the IoT switchgear unique MAC address recorded in the IoT switchgear unique MAC address field of the another user's one-time digital key frame matches a IoT switchgear unique MAC address recorded in the IoT switchgear 200. Then, the time of the time stamp received together with the phone number through the one-time digital key field of the another user's one-time digital key frame is compared with the time of the timestamp registered in the IoT switchgear 200, and when the time registered in the IoT switchgear 200 is a time earlier than the received time or is an initial timestamp time, secondary verification of confirming that the another user's one-time digital key is a valid digital key of the user is completed. When the key verification is completed, the IoT switchgear 200 is opened.

Describing in detail, it is confirmed whether there is a user registered in the IoT switchgear 200 using a corresponding phone number.

When there is a phone number of the user, it is confirmed whether the unique ID (unique MAC address) of the IoT switchgear 200 is the same as the received password. When the same unique ID (unique MAC address) of the IoT switchgear 200 is received, the process proceeds to the next step. The time of the timestamp received together with the phone number is compared with the time of the time stamp registered in the IoT switchgear, and when the time registered in the IoT switchgear 200 is earlier than the received time or is an initial timestamp time, verification is completed confirming that the digital key is a valid digital key of the user. When the verification fails, the digital key is recognized as incorrect, and the switchgear generates a state alarm and enters sleep mode. When the key verification is completed, the IoT switchgear 200 is opened, and when an initial user digital key is received through digital key information after the IoT switchgear 200 is opened, the password of the user is updated. The timestamp of the user is updated with the received timestamp. Since the timestamp is updated at all times, it is impossible to record the digital key or reuse a key issued for one-time use only.

The messaging push module 270 performs a function of transmitting an operating state of the IoT switchgear 200 to the manager terminal. When the IoT switchgear 200 is normally opened, the messaging push module 270 connects to the manager terminal using the Wi-Fi information registered in the IoT switchgear 200 and transmits corresponding information using a registered manager token as a push alarm, and then the switchgear enters the sleep mode.

Meanwhile, as for the form of data recorded in the frame, sound wave data may be recorded in a binary or hexadecimal form in Korean Patent Registration 10-1568314 registered by the applicant of the present invention, and it may be recorded in a decimal number transmission method. That is, when it is assumed that there are a data frame frequency table and a reception number frequency table as shown in FIG. 15, for example, since a total of 19 frequencies are generated as shown in FIG. 16 when a frequency is allocated in the case of transmitting a 20-digit first frame of 12345678901234567890, a 19th frequency is generated as the reception number frequency.

The embodiments in the description of the present invention described above are the most preferred examples selected among various possible examples and presented to help those skilled in the art understand, and the technical spirit of the present invention is not necessarily limited or restricted only by the embodiments, and various changes and modifications and equivalent other embodiments are possible without departing from the technical spirit of the present invention.

The invention claimed is:

1. An IoT switchgear operation system using sound wave communication, the system comprising:
   a communication terminal configured to request, from an IoT switchgear through sound wave communication, any one or more operations among registration of a manager, registration of a user, transmission of a changed password, transmission of a user's one-time digital key for opening or closing an IoT switchgear by the user himself or herself, and transmission of another user's one-time digital key for opening or closing the IoT switchgear from a terminal of another user; and
   the IoT switchgear configured to perform registration of a manager, registration of a user, change of a password, storage of the user's one-time digital key, and opening or closing of a door using another user's one-time digital key requested by the communication terminal through sound wave communication with the communication terminal,
   wherein the communication terminal includes a manager registration frame generation module configured to generate a manager registration frame indicating registration of a manager, in which a manager registration PIN code indicating registration of the manager, manager access IP address information, and Wi-Fi connection information are recorded,
   wherein the IoT switchgear includes:

a sound wave receiver configured to receive sound waves from the manager registration frame through sound waves;
a setting button provided in the IoT switchgear; and
a manager registration module configured to
read a PIN code field of the manager registration frame received by the sound wave receiver when the setting button is pressed for a preset reference time or more,
extract and store the manager access IP address information and the Wi-Fi connection information from the manager registration frame received through the sound wave receiver when a PIN code recorded in the PIN code field of the manager registration frame is the manager registration PIN code,
access Wi-Fi using the Wi-Fi connection information received and stored through the sound wave receiver,
access an IP address accessed by a manager terminal recorded in a manager terminal IP address field of the manager registration frame, and
transmit a unique MAC address of the IoT switchgear to the manager terminal, and
wherein manager registration frame generation module and the manager registration module are each implemented via at least one processor.

2. The system according to claim 1, wherein the communication terminal further includes one or more among:
a user registration frame generation module configured to generate a user registration frame, in which a unique PIN code indicating registration of a user and a phone number of a user terminal having a right to use the IoT switchgear are recorded;
a change password frame generation module configured to generate a change password frame, in which a unique PIN code indicating change of a password and a change password to be changed and registered in the IoT switchgear are recorded;
a user's one-time digital key frame generation module configured to generate a user's one-time digital key frame, in which a unique PIN code indicating transmission of a one-time digital key and a user's one-time digital key are recorded;
an another user's one-time digital key frame generation module configured to generate an another user's one-time digital key frame, in which a unique PIN code indicating transmission of a one-time digital key and another user's one-time digital key are recorded; and
a sound wave transmitter configured to load the manager registration frame, the user registration frame, the change password frame, the user's one-time digital key frame, and the another user's one-time digital key frame on a sound wave signal, and transmitting sound waves,
wherein the user registration frame generation module, the change password frame generation module, the user's one-time digital key frame generation module, and the another user's one-time digital key frame generation module are each implemented via at least one processor.

3. The system according to claim 2, wherein the sound wave receiver for receiving the manager registration frame, is further configured to receive the user registration frame, the change password frame, the user's one-time digital key frame, and the another user's one-time digital key frame through sound waves, and the IoT switchgear further includes:
a user registration module configured to read a PIN code field of a frame received by the sound wave receiver when the setting button is pressed for a preset reference time or more, and extract and store a phone number of a user terminal from the user registration frame received through the sound wave receiver when the PIN code recorded in the PIN code field of the frame is a user registration PIN code;
a change password update module configured to read a PIN code field of a frame received by the sound wave receiver when the setting button is pressed for a preset reference time or more, and extract a changed phone number from the change password frame received through the sound wave receiver and update the password when the PIN code recorded in the PIN code field of the frame is a change password PIN code;
a one-time digital key processing module configured to perform opening or closing of a door using the user's one-time digital key or another user's one-time digital key received through the sound wave receiver when a touch of the IoT switchgear or a set sound wave band is detected; and
a messaging push module configured to transmit an operating state of the IoT switchgear to a manager terminal,
wherein the user registration module, the change password update module, the one-time digital key processing module, and the messaging push module are each implemented via at least one processor.

4. The system according to claim 3, wherein the manager registration frame includes one or more among:
a PIN code field in which a unique manager registration identification PIN code distinguished from those of other sound wave services is recorded;
a manager terminal IP address field in which an IP address accessed by the manager terminal is recorded;
a Wi-Fi SSID field in which an SSID of Wi-Fi accessed by the manager terminal is recorded;
an SSID password field in which an access password for accessing the Wi-Fi is recorded; and
a manager terminal phone number field in which a phone number of the manager terminal to be registered as a manager is recorded.

5. The system according to claim 3, wherein the user registration frame includes one or more among:
a PIN code field in which a unique user registration identification PIN code distinguished from those of other sound wave services is recorded;
a manager password field in which a manager password input by the manager is recorded; and
a user terminal phone number field in which a phone number of a user terminal having a right to open or close the IoT switchgear is recorded.

6. The system according to claim 3, wherein the change password frame includes one or more among:
a PIN code field in which a unique change password identification PIN code distinguished from those of other sound wave services is recorded;
a current user password field in which a previously set current user password is recorded;
a change user phone number field in which a phone number of the user terminal to be changed is recorded; and
a change password field in which a password assigned to the user terminal and will be changed is recorded.

7. The system according to claim 3, wherein the user's one-time digital key includes one or more among:
- a PIN code field in which a unique one-time digital key identification PIN code distinguished from those of other sound wave services is recorded;
- a classification code field in which a user's one-time code indicating that it is a user's one-time digital key used to open or close the IoT switchgear by the user himself or herself is recorded;
- a user password field in which a user password is recorded; and
- a one-time digital key field in which an OTP-type one-time digital key configured of a user terminal phone number for generating a digital key and a time stamp at a time point of inputting the digital key is recorded.

8. The system according to claim 3, wherein the another user's one-time digital key includes one or more among:
- a PIN code field in which a unique one-time digital key identification PIN code distinguished from those of other sound wave services is recorded;
- a classification code field in which another user's one-time code indicating that it is another user's one-time digital key used to open or close the IoT switchgear from the terminal of another user is recorded;
- an IoT switchgear unique MAC address field in which a unique MAC address of the IoT switchgear for performing sound wave communication is recorded; and
- a one-time digital key field in which an OTP-type one-time digital key configured of a user terminal phone number for generating a digital key and a time stamp at a time point of inputting the digital key is recorded.

* * * * *